(No Model.) 4 Sheets—Sheet 3.
H. W. MORGAN.
POWER TRANSMITTING MECHANISM.
No. 568,917. Patented Oct. 6, 1896.
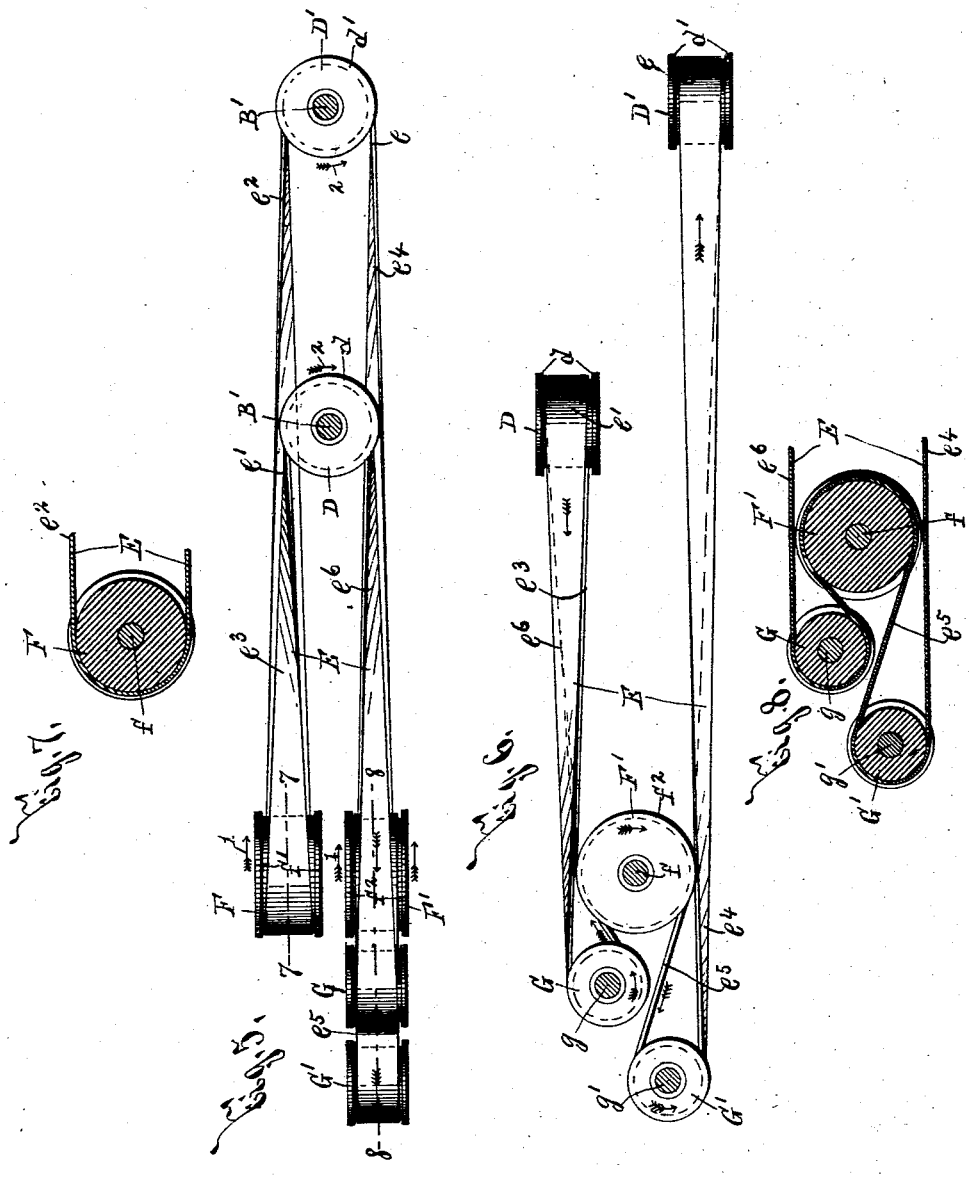
WITNESSES:
INVENTOR
Henry W. Morgan
BY
Hay, Wilkinson & Parsons,
ATTORNEYS.

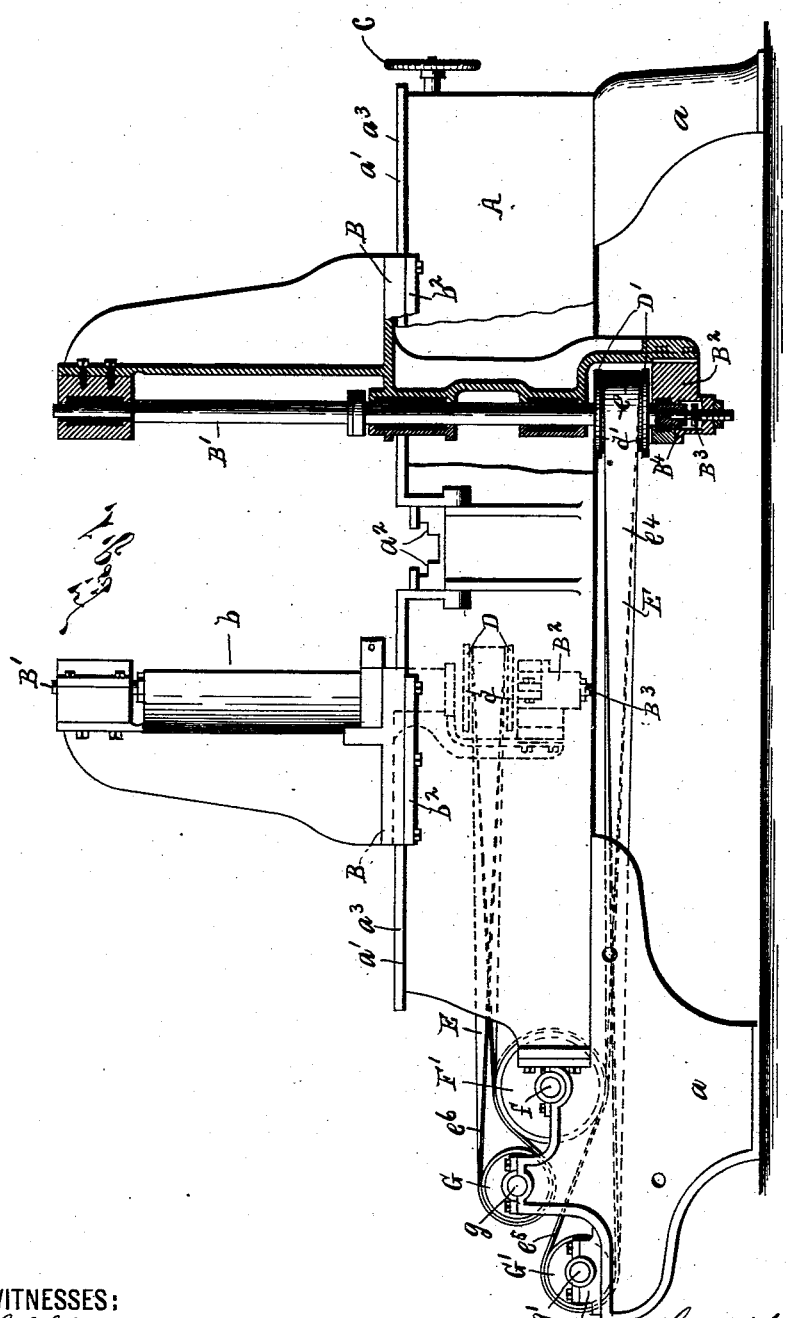

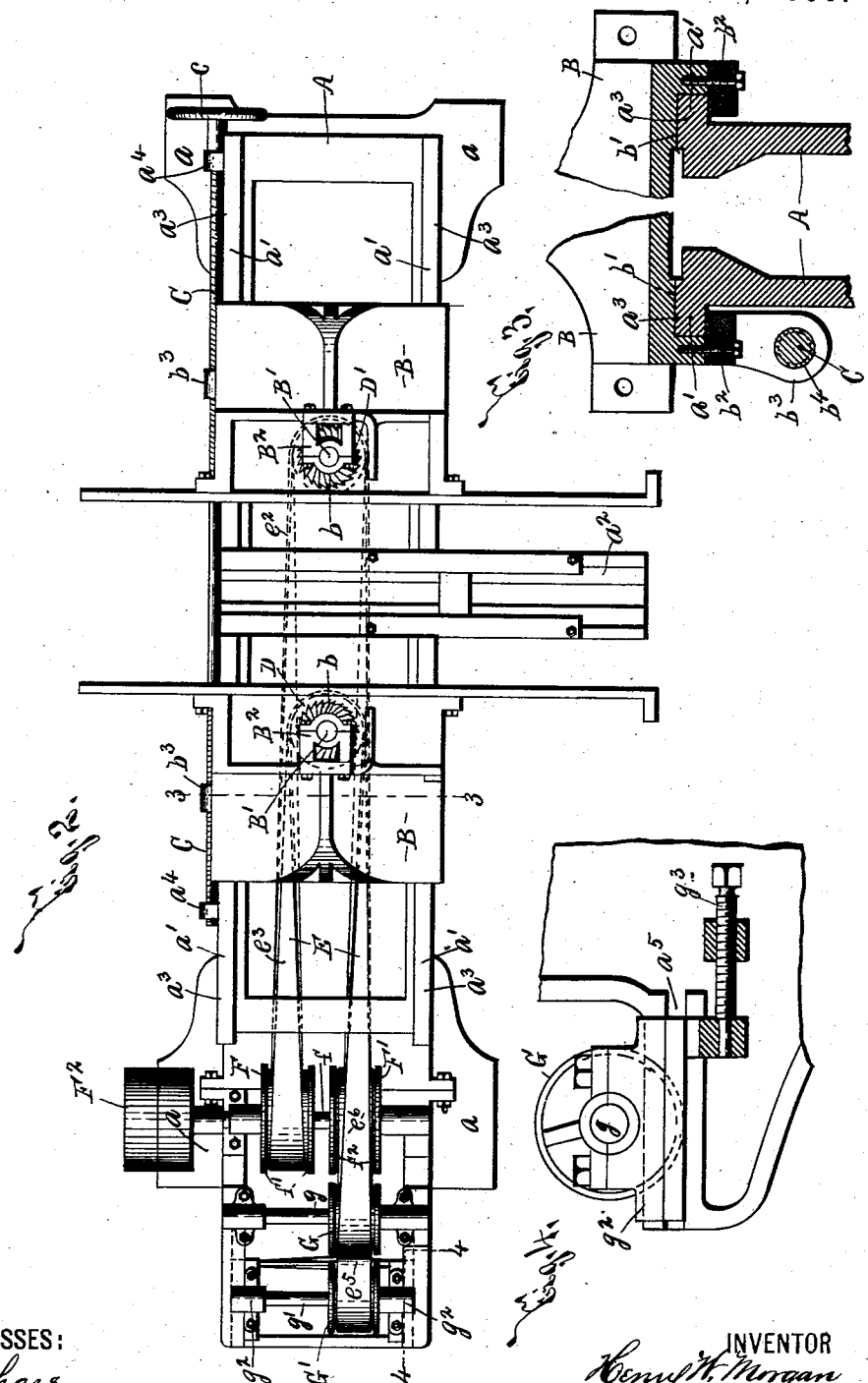

(No Model.) 4 Sheets—Sheet 4.
H. W. MORGAN.
POWER TRANSMITTING MECHANISM.
No. 568,917. Patented Oct. 6, 1896.
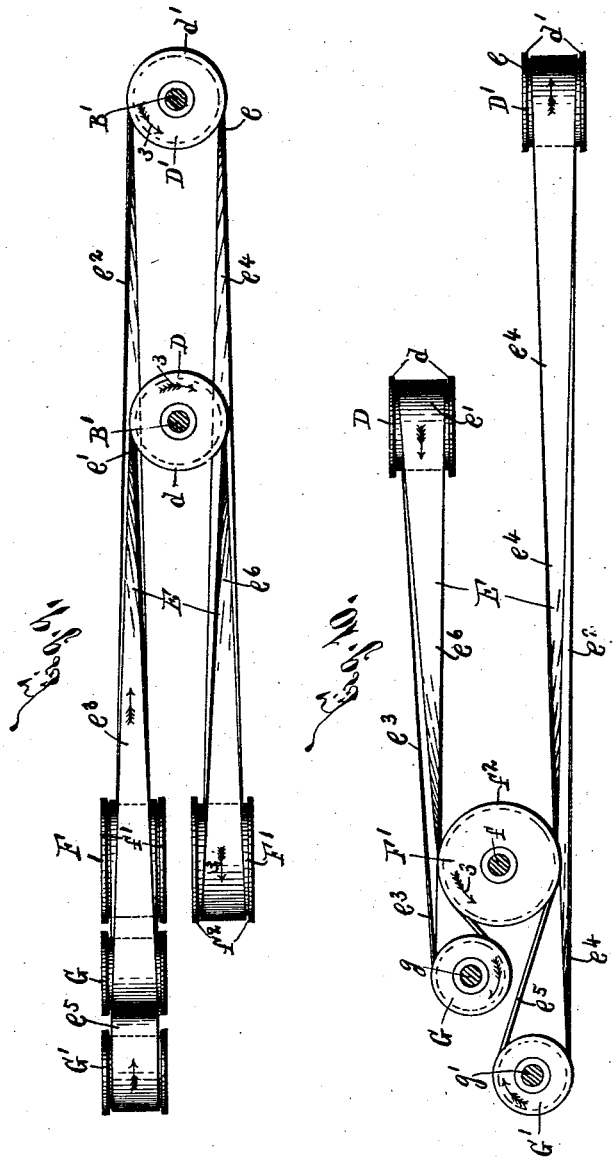
WITNESSES:
INVENTOR
Henry W. Morgan
BY
Key Wilkinson & Parsons,
ATTORNEYS

UNITED STATES PATENT OFFICE.

HENRY W. MORGAN, OF ROCHESTER, NEW YORK.

POWER-TRANSMITTING MECHANISM.

SPECIFICATION forming part of Letters Patent No. 568,917, dated October 6, 1896.

Original application filed December 29, 1892, Serial No. 456,631. Divided and this application filed March 27, 1894. Serial No. 505,282. (No model.)

*To all whom it may concern:*

Be it known that I, HENRY W. MORGAN, of Rochester, in the county of Monroe, in the State of New York, have invented new and useful Improvements in Power-Transmitting Mechanisms, of which the following, taken in connection with the accompanying drawings, is a full, clear, and exact description.

My invention relates to improvements in power-transmitting mechanisms particularly applicable for use with the grooving-machine forming the subject-matter of United States Letters Patent No. 517,705, dated April 3, 1894, of the application for which my present application is a division, and has for its object the production of a simple and practical device for uniformly driving a pair of opposite cutter-heads or other revolving parts by a single belt having its separate driving portions uniformly tensioned; and to this end it consists, essentially, in the construction and arrangement of the parts, all as hereinafter more particularly described, and pointed out in the claims.

In describing this invention reference is had to the accompanying drawings, forming a part of this specification, in which like letters indicate corresponding parts in all the views.

Figures 1 and 2 are respectively a side elevation and a top plan view of a portion of the frame and cutter-head bearings of a grooving-machine provided with my improved power-transmitting mechanism, a portion of the frame and one of the bearings being shown in section at Fig. 1. Figs. 3 and 4 are transverse vertical sectional views taken, respectively, on lines 3 3 and 4 4, Fig. 2, the upper idler and its shaft being removed at Fig. 4. Figs. 5 and 6 are respectively a top plan view and a side elevation of the detached secondary driving-pulleys, the belt for revolving said pulleys, and the main driving-pulleys and idlers for said belt. Figs. 7 and 8 are detail sectional views taken, respectively, on lines 7 7 and 8 8, Fig. 5; and Figs. 9 and 10 are respectively a top plan view and a side elevation of the parts as shown at Figs. 9 and 10, with the exception that the belt and idlers are arranged to revolve the secondary driving-pulleys in the same direction as at Figs. 5 and 6 when the main driving-shaft is revolved in a reverse direction.

The frame A for supporting my improved power-transmitting mechanism may be of any desirable form, size, and construction, and is here illustrated as provided with legs $a\ a'$ and a lengthwise guide $a'$, having its central portion cut away and provided with a crosswise guide $a^2$ for receiving a suitable carriage, not necessary to herein illustrate or describe. The guide $a'$ may be of any suitable construction, but consists, preferably, of lengthwise ribs or shoulders $a^3$, arranged along the tops of the longitudinal sides of the frame A.

Movable along the guide $a'$ are suitable bearings B B, which are also of any desirable form, size, and construction for supporting the cutter-heads $b\ b$ or other revolving parts with which my invention is used. The bearings B B, as best seen at Fig. 3, are formed with separated faces $b'\ b'$, resting upon the top faces of the ribs $a^3\ a^3$ of the guide $a'$, and longitudinal shoulders $b^2\ b^2$, engaging the under faces of said ribs $a^3\ a^3$.

Suitable means may be used for adjusting one of the bearings B B toward and away from the other, or for simultaneously adjusting both of the bearings, and I have here illustrated the rear face of each bearing as provided with a projecting ear $b^3$, having a screw-threaded aperture or opening $b^4$ therein for receiving the corresponding end of an adjusting-screw C. The ends of the screw C are threaded in opposite directions and are journaled in ears $a^4\ a^4$, projecting from the rear face of the frame A. A suitable hand-wheel or other actuating device $c$ is secured to one extremity of the screw C for effecting its rotation, and as the screw C is revolved the bearings B B are simultaneously moved toward and away from each other.

The cutter-heads or other revolving parts $b\ b$ are of any desirable form, size, and construction, and are suitably secured to upright secondary driving-shafts B' B', journaled in the bearings B B, and as the bearings B B are moved toward and away from each other the shafts B' B' are also simultaneously moved toward and away from each other. The journal-bearings B² B² of the bearings B B for the shafts B' B' are of any suitable construction, and, as clearly seen at Fig. 1, the lower journal-bearing B² of each bearing B B is formed with an adjustable supporting-piece B³, upon which rests a hardened plug B⁴, projecting from the lower end of the corresponding shaft B'.

D D' are secondary driving pulleys or wheels secured to the shafts B' B' for revolving the same, and, as clearly seen at Figs. 1 and 6, these pulleys are arranged one above the other, so that their peripheral faces are in different horizontal planes.

E represents a single belt, which is so supported and arranged as to uniformly drive both of the shafts B' B', and consequently its opposite driving portions are uniformly tensioned for effecting this result.

The belt E is driven by main driving-pulleys F F', arranged, preferably, side by side at one side of the secondary driving-pulleys D D' in a plane disposed at an angle with the axes of the shafts B' B'. The axes of the main driving-pulleys are disposed in planes substantially coincident with each other and one of the secondary driving-pulleys, as D, is interposed between the pulleys D' F F'. The main driving-pulleys F F' are revolved by a suitable main driving-shaft $f$, journaled in the frame A and provided with tight and loose pulleys F² or other suitable actuating wheels, to which power is transmitted by any desirable form of power-transmitting mechanism, not necessary to herein illustrate or describe. I prefer to use two separate pulleys F F' upon the shaft $f$, but it will be evident that a single pulley of sufficient width provided with separated peripheral faces may be used, if desired.

The pulleys D D' F F' are so relatively supported and arranged that the driving-belt makes a quarter-turn, and thus passes practically and effectively from the pulleys D D' over the main driving-pulleys without liability of escape therefrom. I deem it advisable, however, to provide the pulleys D D' F F' with flanges $d$ $d'$ $f'$ $f^2$ for preventing escape of the belt therefrom.

G G' are idlers which guide the belt E and are preferably arranged in alinement with one of the main driving-pulleys, as the one F', and are formed of less diameter than the driving-pulleys F F', and arranged one above the other with their axes in different horizontal planes and with one nearer the pulley F' than the other. The idlers G G' are mounted upon shafts $g$ $g'$, supported by the frame A, and, as best seen at Fig. 4, the shaft $g$ is provided with a movable bearing $g^2$, which is guided in ways $a^5$ of the frame A and is adjusted to the desired position by a suitable adjuster $g^3$, consisting, preferably, of a movable screw.

The belt E is formed with separate driving-loops $e$ $e'$, arranged one above the other and having their adjacent ends passed around corresponding portions of the pulleys D D'. One branch $e^2$ of the loop $e$ is passed around the pulley F, and is connected to or merged into the corresponding branch $e^3$ of the loop $e'$. The opposite branch $e^4$ of the loop $e$ is passed beneath the pulley F' and around the rear lower idler G', and is connected to or merged into a section $e^5$ of the belt E, having its central portion passed between the pulley F' and the branch $e^4$ and around the pulley F' and having its opposite extremity passed around the idler G and connected to or merged into the opposite branch $e^6$ of the loop $e'$.

It will be readily apparent to one skilled in the art that when the main driving-pulleys are revolving in the direction indicated by arrows 1 the belt E rotates the pulleys D D' in the direction indicated by arrows 2 and moves their adjacent faces in the same direction, and that both driving-loops of the belt E are uniformly tensioned irrespective of the amount of separation of the pulleys D D'. Both pulleys D D' are simultaneously movable toward and away from each other, and the main driving-pulleys and idlers are arranged at one side of said pulleys, and consequently when one pulley is moved toward the main driving-pulleys and idlers the opposite pulley is moved away from said pulleys and idlers, thus further insuring uniform tension of the driving portions of the belt.

My power-transmitting mechanism is often used on a machine the main driving-shaft $f$ of which rotates in an opposite direction to that indicated by arrow 1 at Fig. 5 or in the direction indicated by arrows 3 at Figs. 9 and 10. It then becomes necessary to move the idlers G G' into alinement with the main driving-pulley F, and to pass the branches $e^4$ $e^6$ of the loops $e$ $e'$ around the pulley F', and the branch $e^2$ of the loop $e$ beneath the pulley F and around the idler G', and to pass the section $e^5$ of the belt around the pulley F and the idler G and connect or merge said section into the branch $e^3$ of the loop $e'$. The adjacent faces of the pulleys D D' will then be revolved in the same direction, even though the main driving-shaft $f$ rotates in a direction opposite to that indicated by arrow 1.

My invention will be readily perceived upon reference to the drawings and the foregoing description, and it will be particularly noted that it is extremely practical and simple and operates to uniformly rotate a pair of opposite shafts, one or both of which is adjustably mounted, and requires but a single belt, which is so supported, driven, and guided that its separated driving portions are uniformly tensioned.

My power-transmitting mechanism is not limited to the particular construction of frame for supporting the same, the construction of the bearings for moving the revolving shafts toward and away from each other, and the exact construction and arrangement of the main and secondary driving-pulleys and the idlers.

Having thus fully described my invention, what I claim as new, and desire to secure by Letters Patent, is—

1. The combination of movable oppositely-arranged bearings, means for simultaneously adjusting said bearings toward and away from each other, a pair of upright shafts journaled in the bearings, a pair of secondary driving-pulleys mounted on the shafts and having their peripheral faces arranged in different horizontal planes, a pair of main driving-pulleys arranged side by side at one side of said shafts in a plane disposed at an angle with the axes of the shafts, a pair of idlers alined with one of the main driving-pulleys and having their axes arranged in different planes, and a belt having separated driving-loops passed over said pulleys mounted on the shafts, one branch of one loop being passed over one main driving-pulley and connected to or merged into the corresponding branch of the other driving-loop and the opposite branch of the former loop being passed at one side of the other main driving-pulley and around the idler alined with the adjacent side of the latter main driving-pulley and connected to or merged into one extremity of a section of the belt having its intermediate portion passed between said branch of the latter loop and the adjacent face of the latter main driving-pulley and around said latter driving-pulley, and its opposite extremity passed around the second idler and connected to or merged into the opposite branch of the former loop, substantially as and for the purpose described.

2. The combination with main driving-pulleys arranged side by side, and having their axes disposed in planes substantially coincident, and idlers supported at one side of the main driving-pulleys and revoluble on axes arranged parallel with the former axes, said idlers being alined with one of the main driving-pulleys and one of the idlers being arranged above the other and nearer than the other to the adjacent driving-pulley; of a frame, bearings arranged at the opposite side of the main driving-pulleys and movable along the frame toward and away from each other, and the main driving-pulleys, one of said bearings being nearer than the other to said driving-pulleys, shafts journaled in the bearings and arranged at an angle with the axes of the main driving-pulleys, secondary driving-pulleys mounted on the shafts and arranged one above the other, and a belt passing over the main driving-pulleys, and idlers, and having driving-loops of unequal length arranged one above the other and passed respectively over the secondary driving-pulleys, substantially as and for the purpose set forth.

In testimony whereof I have hereunto signed my name, in the presence of two attesting witnesses, at Rochester, in the county of Monroe, in the State of New York, this 22d day of March, 1894.

HENRY W. MORGAN.

Witnesses:
HERSCHEL E. CHASE,
CLARK H. NORTON.